US008549619B2

(12) United States Patent
Bumpus et al.

(10) Patent No.: US 8,549,619 B2
(45) Date of Patent: *Oct. 1, 2013

(54) REMOVABLE HARD DISK WITH EMBEDDED SECURITY CARD

(75) Inventors: Winston Bumpus, Austin, TX (US);
Ajay Agarwal, Austin, TX (US);
William A. Curtis, Austin, TX (US);
Thomas L. Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1025 days.

This patent is subject to a terminal disclaimer.

(21) Appl. No.: 11/625,445

(22) Filed: Jan. 22, 2007

(65) Prior Publication Data

US 2008/0178007 A1    Jul. 24, 2008

(51) Int. Cl.
*G06F 21/00* (2013.01)
(52) U.S. Cl.
USPC ............... 726/17; 726/16; 726/26; 726/27; 726/28; 726/29
(58) Field of Classification Search
USPC ................ 726/17, 16, 26, 27, 28, 29
See application file for complete search history.

(56) References Cited

U.S. PATENT DOCUMENTS

| | | | | |
|---|---|---|---|---|
| 4,958,064 A * | 9/1990 | Kirkpatrick | ............... | 235/384 |
| 5,623,637 A * | 4/1997 | Jones et al. | ............... | 711/164 |
| 5,748,744 A | 5/1998 | Levy et al. | ............... | 380/52 |
| 5,757,919 A | 5/1998 | Herbert et al. | ............... | 380/25 |
| 5,845,066 A * | 12/1998 | Fukuzumi | ............... | 726/19 |
| 5,930,358 A | 7/1999 | Rao | ............... | 380/4 |
| 5,956,633 A | 9/1999 | Janhila | ............... | 455/410 |
| 6,671,744 B1 * | 12/2003 | Naito et al. | ............... | 719/321 |
| 6,868,160 B1 | 3/2005 | Raji | ............... | 380/30 |
| 6,871,063 B1 | 3/2005 | Schiffer | ............... | 455/410 |
| 6,871,278 B1 | 3/2005 | Sciupac | ............... | 713/185 |
| 6,917,490 B2 | 7/2005 | Pratt et al. | ............... | 360/78.08 |
| 6,957,330 B1 | 10/2005 | Hughes | ............... | 713/163 |
| 6,971,016 B1 | 11/2005 | Barnett | ............... | 713/182 |
| 6,973,187 B2 | 12/2005 | Gligor et al. | ............... | 380/28 |
| 6,980,659 B1 | 12/2005 | Elliott | ............... | 380/277 |
| 7,043,641 B1 | 5/2006 | Martinek et al. | ............... | 713/187 |
| 7,054,845 B2 | 5/2006 | Oshima et al. | ............... | 705/78 |
| 7,058,969 B2 | 6/2006 | Sambati | ............... | 726/2 |
| 7,069,447 B1 | 6/2006 | Corder | ............... | 713/189 |
| 7,114,082 B2 | 9/2006 | Klein | ............... | 713/193 |
| 7,130,426 B1 | 10/2006 | Cha et al. | ............... | 380/201 |
| 7,140,044 B2 | 11/2006 | Redlich et al. | ............... | 726/27 |

(Continued)

*Primary Examiner* — Bradley Holder
(74) *Attorney, Agent, or Firm* — Terrile, Cannatti, Chambers & Holland, LLP; Stephen A. Terrile (57) ABSTRACT

A system and method is disclosed for authenticating a removable data storage device (RDSD) by implementing a removable trusted information module (TIM) comprising a non-volatile storage medium operable to securely store passwords, digital keys, digital certificates and other security credentials ("security credentials"). An RDSD enclosure comprising a disk storage drive, one or more interfaces, one or more connectors, and a TIM is implemented to be connected, disconnected and reconnected to a plurality of predetermined information handling systems. The RDSD is authenticated by the TIM initiating comparison and cryptographic operations between its contents and the contents of authentication files comprising the RDSD. Once the RDSD has been authenticated, the TIM performs similar operations to authorize access and usage of its contents by the information handling system. Other cryptographic operations are performed to determine whether the integrity of data files has been compromised. Removal of the TIM prevents an information handling system from accessing the contents of the RDSD.

6 Claims, 6 Drawing Sheets

(56) References Cited

U.S. PATENT DOCUMENTS

| | | | |
|---|---|---|---|
| 7,146,495 B2 | 12/2006 | Baldwin et al. | 713/100 |
| 7,146,644 B2 | 12/2006 | Redlich et al. | 726/27 |
| 7,149,901 B2 | 12/2006 | Herbert et al. | 713/190 |
| 7,152,165 B1 | 12/2006 | Maheshwari et al. | 713/193 |
| 7,152,693 B2 | 12/2006 | Man et al. | 173/183 |
| 7,159,776 B2 | 1/2007 | Pratt | 235/454 |
| 7,162,647 B2 | 1/2007 | Osaki | 713/193 |
| 2002/0157010 A1 | 10/2002 | Dayan et al. | 713/191 |
| 2002/0194209 A1* | 12/2002 | Bolosky et al. | 707/205 |
| 2004/0039969 A1 | 2/2004 | Pratt et al. | 714/42 |
| 2004/0061970 A1 | 4/2004 | Pratt et al. | 360/78.08 |
| 2005/0039013 A1* | 2/2005 | Bajikar et al. | 713/172 |
| 2005/0066199 A1* | 3/2005 | Lin | 713/201 |
| 2005/0077351 A1* | 4/2005 | De Jong | 235/380 |
| 2006/0026417 A1 | 2/2006 | Furusawa et al. | 713/2 |
| 2006/0034581 A1 | 2/2006 | Konetski et al. | 386/46 |
| 2006/0085347 A1* | 4/2006 | Yiachos | 705/51 |
| 2006/0136717 A1* | 6/2006 | Buer et al. | 713/155 |
| 2006/0277598 A1* | 12/2006 | Ahn | 726/5 |
| 2006/0288185 A1 | 12/2006 | Brisse et al. | 711/170 |
| 2007/0038856 A1* | 2/2007 | Ali et al. | 713/164 |
| 2007/0050398 A1* | 3/2007 | Mochizuki | 707/102 |
| 2007/0165253 A1* | 7/2007 | Usui et al. | 358/1.9 |
| 2007/0168677 A1* | 7/2007 | Kudo et al. | 713/185 |
| 2007/0172222 A1* | 7/2007 | Kakutani et al. | 396/266 |
| 2007/0209064 A1 | 9/2007 | Qin et al. | 726/5 |
| 2007/0214369 A1* | 9/2007 | Roberts et al. | 713/192 |
| 2008/0034421 A1 | 2/2008 | Ahn et al. | 726/17 |
| 2008/0169350 A1* | 7/2008 | Audebert et al. | 235/492 |

* cited by examiner

REMOVABLE HARD DISK WITH EMBEDDED SECURITY CARD

BACKGROUND OF THE INVENTION

1. Field of the Invention

The present invention relates in general to the field of information handling systems and, more particularly, to ensuring the security and integrity of data on a removable storage system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The diversity and amount of data managed by information handling systems continues to grow for consumer, corporate and government markets alike. This growth is driving the need for cost effective, scalable storage systems that can be quickly and easily configured for a wide variety of uses and applications. One approach to address these needs is the use of self-contained, transportable mass storage units that easily attach to a variety of systems. Another popular approach consists of mass storage devices that are mounted in standardized, interchangeable modules that can be transferred between systems. These interchangeable mass storage units are commonly used in the implementation of redundant array of independent disks (RAID) subsystems, which are already popular in corporate and government environments and are now gaining consumer acceptance as well.

RAID subsystems can share or replicate data across multiple disk drives, any of which can typically be removed and replaced ("hot swapped") while the system is running. While a RAID controller can check a disk's information to confirm its assignment to a particular array or group, it can neither verify the authenticity of the disk, the validity of the data it contains, or whether the data is authorized to be used by the system. Furthermore, no solution currently exists for embedding a multi-factor, programmable security device within a removable mass storage device to first authenticate it to a system when it is attached and then securely control the bi-directional transfer of the data. As a result, the ability to easily remove, transport and attach disk storage devices to other systems without the means to control the transfer of the data they contain creates security vulnerabilities. For example, even if the information on a disk drive is encrypted, access to the device itself is not secured. The lack of access control devices such as a trusted information module allows the disk to be removed and its contents copied or mirrored to another system, which can then be used in an attempt to decrypt the data. Accordingly, removable and portable storage systems also need to securely and reliably sustain information integrity and availability, regardless of the system they are attached to.

SUMMARY OF THE INVENTION

In accordance with the present invention, a system and method is disclosed for authenticating a removable data storage device (RDSD), by using a trusted information module (TIM). In various embodiments of the invention, the TIM comprises a non-volatile storage medium operable to securely store passwords, digital keys, digital certificates and other security credentials. In some embodiments of the invention, the RDSD is contained in an enclosure comprising a disk drive or other mass storage device, one or more interfaces, and a TIM. The enclosure also includes one or more connectors that allow the RDSD to be connected to an information handling system. In one embodiment of the invention, the TIM is internally coupled to an interface for the disk storage device. In another embodiment, the TIM is externally coupled to an interface for the disk storage device. In yet another embodiment, the TIM is externally coupled to an interface for the disk storage device that is externally accessible from the RDSD enclosure.

In some embodiments of the invention, the RDSD is connected to an information handling system and the TIM initiates a plurality of authentication and authorization processes. Once connected, the TIM uses the contents of one or more authentication files and the security credentials stored in its non-volatile storage medium to perform comparison and cryptographic operations to authenticate the RDSD to the information handling system. Upon completion of the comparison and cryptographic operations, the authenticity of the RDSD is determined. If the authentication operations were successful, a message is conveyed by the TIM to the information system asserting the authenticity of RDSD. Once the RDSD has been successfully authenticated, the TIM performs similar comparison and cryptographic operations with the contents of one or more authorization files to authorize the access and usage of the plurality of data files comprising the RDSD.

In another embodiment of the invention, the TIM performs other cryptographic operations to determine whether the integrity of data files has been compromised and then conveys their integrity status to the predetermined information handling system. In yet another embodiment of the invention, a user input device and display screen are implemented to prompt the user to enter additional identity verification or authentication information. In still yet another embodiment, removal of the TIM prevents an information handling system from accessing the contents of the RDSD.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for authenticating a removable data storage device (RDSD) for use with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
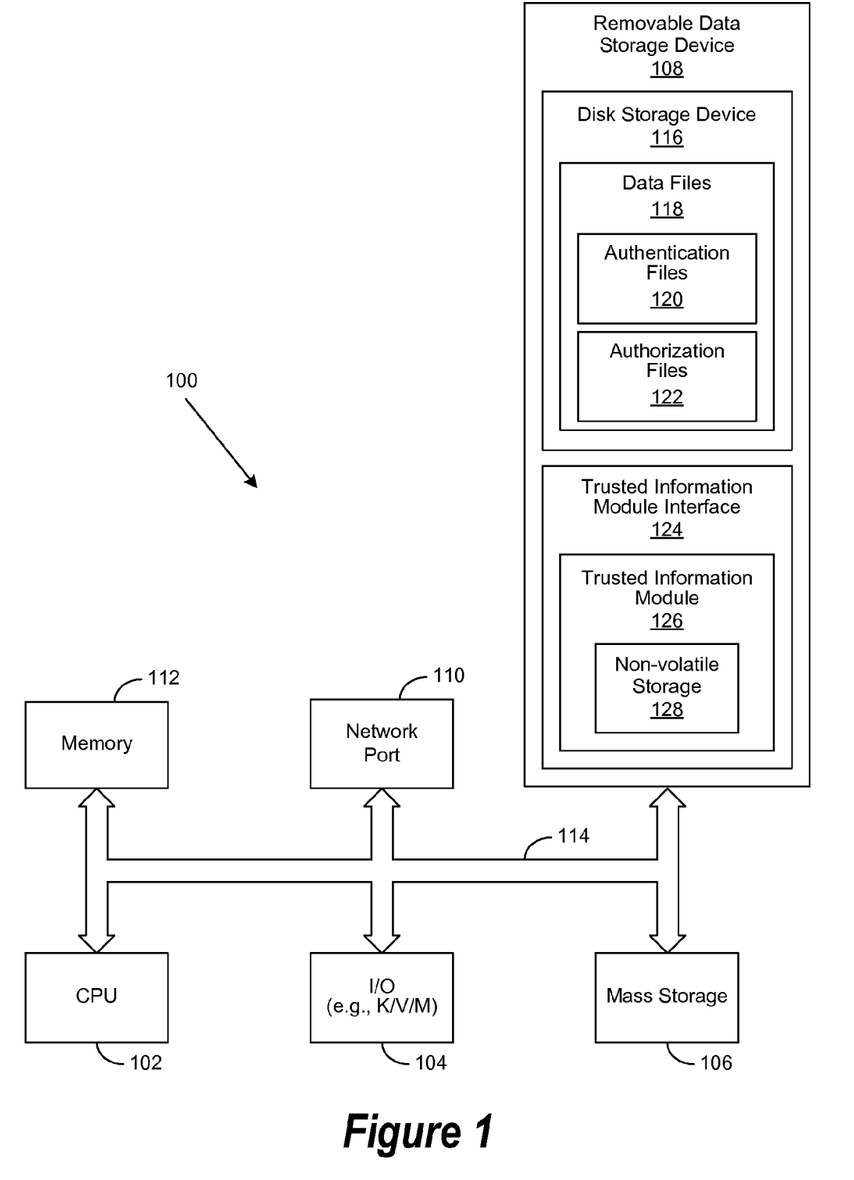
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or mass storage 106, various other subsystems, such as removable data storage device 108, network port 110 operable to connect to a network, and system memory 1 12, all interconnected via one or more buses 114. Removable data storage device 108 comprises disk storage device 116 and trusted information module interface 124. Trusted information module interface 124 further comprises trusted information module (TIM) 126, which comprises non-volatile storage medium 128, operable to securely store passwords, digital keys, digital certificates and other security credentials. Disk storage device 116 comprises a plurality of data files 118, which further comprise one or more authentication files 120, and one or more authorization files 122.

Figure 2:
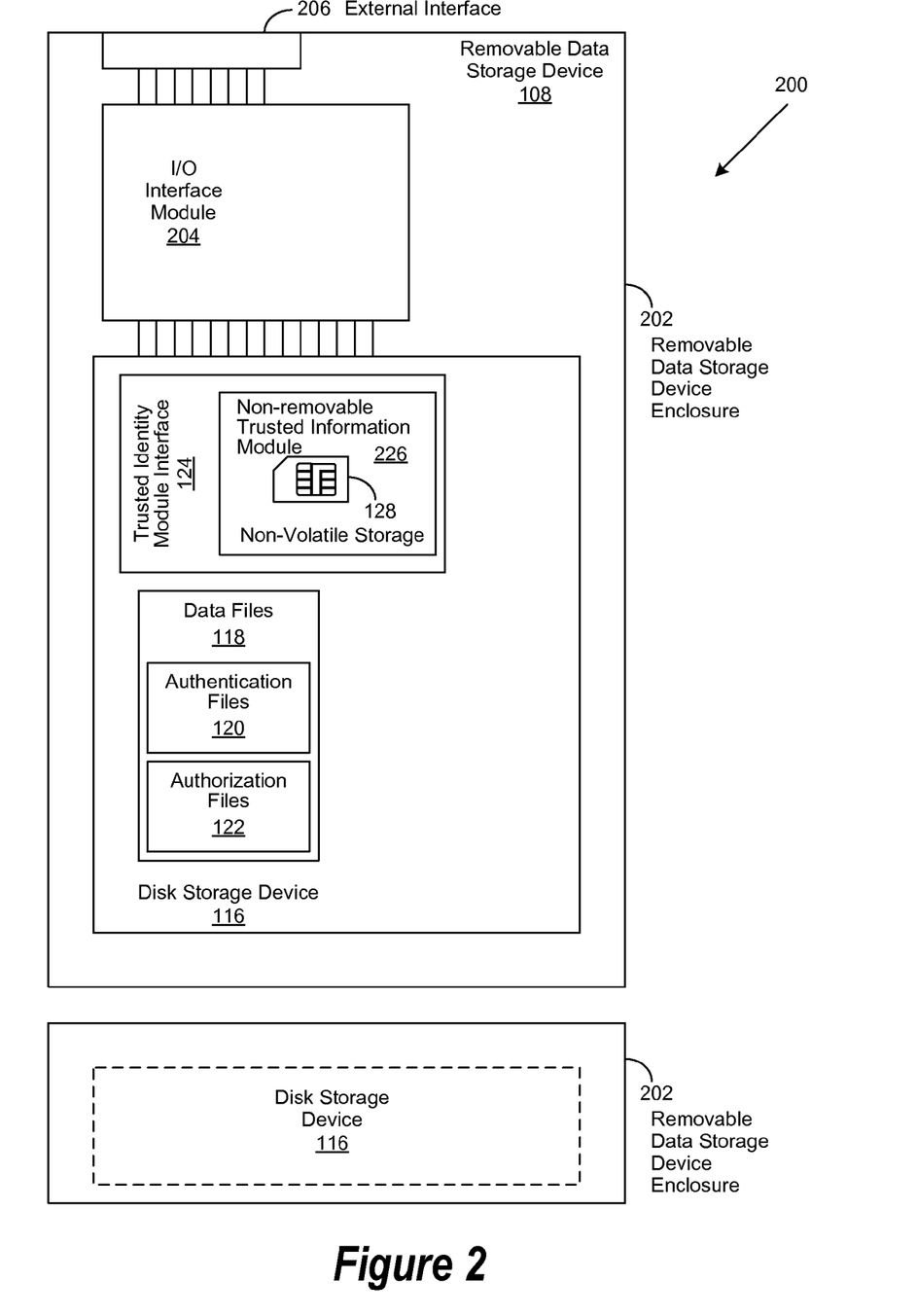
FIG. 2 is a generalized block diagram illustrating an embedded, removable trusted information module (TIM) as implemented in a removable data storage device (RDSD) in accordance with an embodiment of the invention.

FIG. 2 is a generalized block diagram illustrating an internally-coupled trusted information module (TIM) 200 as implemented in a removable data storage device (RDSD) in accordance with an embodiment of the invention. In selected embodiments, RDSD 108 comprises disk storage device 116, RDSD enclosure 202, input/output (I/O) interface module 204, and external interface 206. Disk storage device 116 comprises an internally-coupled TIM interface 124, further comprising internally-coupled, non-removable TIM 226, implemented to perform authentication and authorization security operations. Internally-coupled, non-removable TIM 226 further comprises non-volatile storage medium 128, implemented to securely store passwords, digital keys, digital certificates and other security credentials ("security credentials"). In one embodiment, internally-coupled, non-removable TIM 226 is physically coupled to TIM interface 124. Disk storage device 116 further comprises a plurality of data files 118, further comprising one or more authentication files 120, and one or more authorization files 122.

In an embodiment of the invention, a plurality of authentication and authorization processes are initiated by the internally-coupled, non-removable TIM 226 when the RDSD 108 is connected to an information handling system. Once connected, the internally-coupled, non-removable TIM 226 uses the contents of one or more authentication files 120 and the security credentials stored in non-volatile storage medium 128 to perform comparison and cryptographic operations familiar to those of skill in the art to authenticate RDSD 108 to the information handling system. Upon completion of the comparison and cryptographic operations, the authenticity of RDSD 108 is determined and if the operations were successful, a message is conveyed by the internally-coupled, non-removable TIM 226 to the information system asserting the authenticity of RDSD 108. Once the RDSD 108 has been successfully authenticated, the internally-coupled and removable TIM 226 performs similar comparison and cryptographic operations with the contents of one or more authorization files 122 to authorize the access and usage of the plurality of data files 118 by the information handling system. In one embodiment of the invention, the internally-coupled, non-removable TIM 226 performs other cryptographic operations to determine whether the integrity of data files 118 has been compromised and then conveys their integrity status to the information handling system. In another embodiment, removal of the internally-coupled, non-removable TIM 226 prevents an information handling system from accessing the plurality of data files 11 8.

Figure 3:
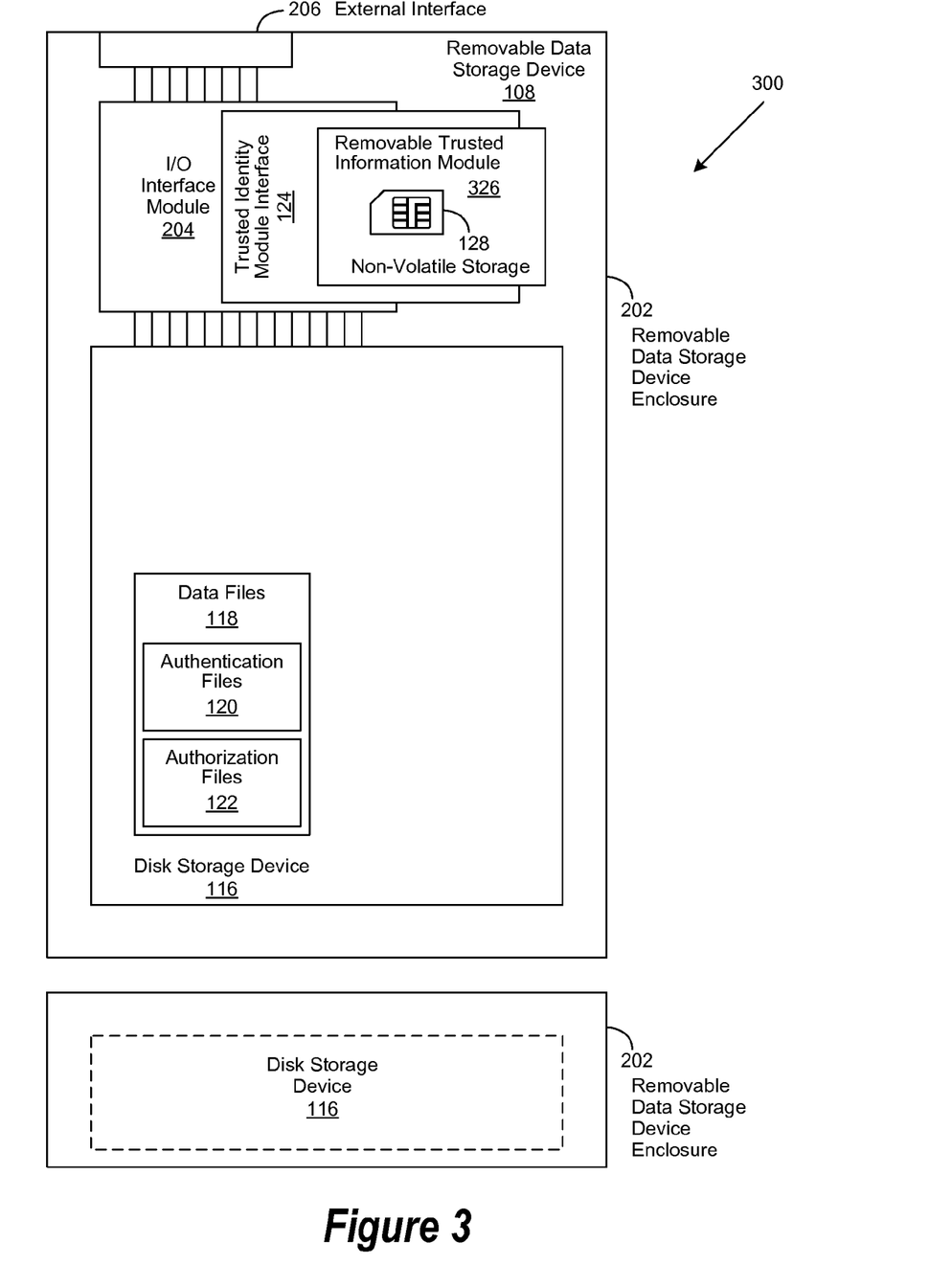
FIG. 3 is a generalized block diagram illustrating an internally-coupled TIM as implemented in an RDSD in accordance with an embodiment of the invention.

FIG. 3 is a generalized block diagram illustrating an externally-coupled, removable trusted information module (TIM) 300 as implemented in a removable data storage device (RDSD) in accordance with an embodiment of the invention. In this embodiment, RDSD 108 comprises disk storage device 116, RDSD enclosure 202, input/output (I/O) interface module 204, and external interface 206. RDSD 108 further comprises an TIM interface 124, internally-coupled to input/output (I/O) interface module 204, and further comprising externally-coupled and removable TIM 326, which comprises non-volatile storage medium 128, operable to securely store passwords, digital keys, digital certificates and other security credentials ("security credentials"). In one embodiment, externally-coupled and removable TIM 326 is coupled to TIM interface 124 by physical contacts. Disk storage device further comprises a plurality of data files 118, one or more authentication files 120, and one or more authorization files 122.

In an embodiment of the invention, a plurality of authentication and authorization processes are initiated by the removable TIM 326 when the RDSD 108 is connected to an information handling system. Once connected, the removable TIM 326 uses the contents of one or more authentication files 120 and the security credentials stored in non-volatile storage medium 128 to perform comparison and cryptographic operations familiar to those of skill in the art to authenticate RDSD 108 to the information handling system. Upon completion of the comparison and cryptographic operations, the authenticity of RDSD 108 is determined and if the operations were successful, a message is conveyed by the removable TIM 326 to the information system asserting the authenticity of RDSD 108. Once the RDSD 108 has been successfully authenticated, the removable TIM 326 performs similar comparison and cryptographic operations with the contents of one or more authorization files 122 to authorize the access and usage of the plurality of data files 118 by the information handling system. In one embodiment of the invention, the removable TIM 326 performs other cryptographic operations to determine whether the integrity of data files 118 has been compromised and then conveys their integrity status to the information handling system. In another embodiment, removal of the removable TIM 326 prevents an information handling system from accessing the plurality of data files 118.

Figure 4:
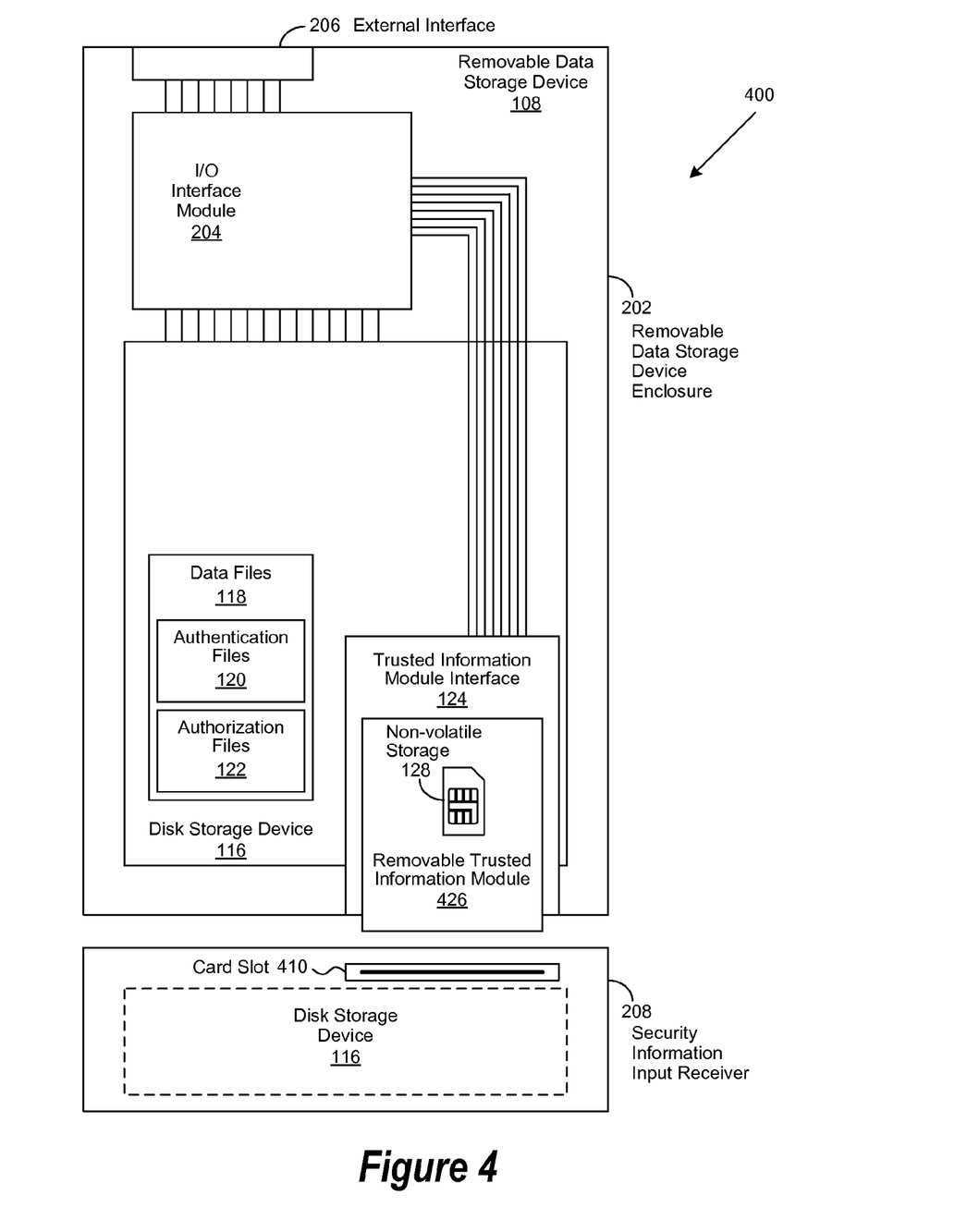
FIG. 4 is a generalized block diagram illustrating an externally-coupled TIM as implemented in an RDSD in accordance with an embodiment of the invention.

FIG. 4 is a generalized block diagram illustrating an externally-coupled, removable trusted information module (TIM) 400 as implemented in a removable data storage device (RDSD) in accordance with an embodiment of the invention. In this embodiment, RDSD 108 comprises disk storage device 116, RDSD enclosure 202, input/output (I/O) interface module 204, external interface 206, RDSD information input receiver 208, and external card slot 410. RDSD 108 further comprises the TIM interface 124, externally-coupled to input/output (I/O) interface module 204, and further comprising externally-coupled and removable TIM 426, which comprises non-volatile storage medium 128, operable to securely store passwords, digital keys, digital certificates and other security credentials ("security credentials"). In one embodiment, externally-coupled and removable TIM 426 is coupled to TIM interface 124 by physical contacts. Disk storage device 116 further comprises a plurality of data files 118, one or more authentication files 120, and one or more authorization files 122.

In an embodiment of the invention, a plurality of authentication and authorization processes are initiated when the RDSD 108 is first connected to an information handling system and externally-coupled and removable TIM 426 is then connected to TIM interface 124 through external card slot 410. Upon completion of the comparison and cryptographic operations, the authenticity of RDSD 108 is determined and if the operations were successful, a message is conveyed by the externally-coupled and removable TIM 426 to the information system asserting the authenticity of RDSD 108. Once the RDSD 108 has been successfully authenticated, the externally-coupled and removable TIM 426 performs similar comparison and cryptographic operations with the contents of one or more authorization files 122 to authorize the access and usage of the plurality of data files 118 by the information handling system. In one embodiment of the invention, the externally-coupled and removable TIM 426 performs other cryptographic operations to determine whether the integrity of data files 118 has been compromised and then conveys their integrity status to the information handling system. In another embodiment, removal of the removable TIM 426 from external card slot 410 results in a loss of connection to TIM interface 124 and prevents an information handling system from accessing the plurality of data files 118.

Figure 5:
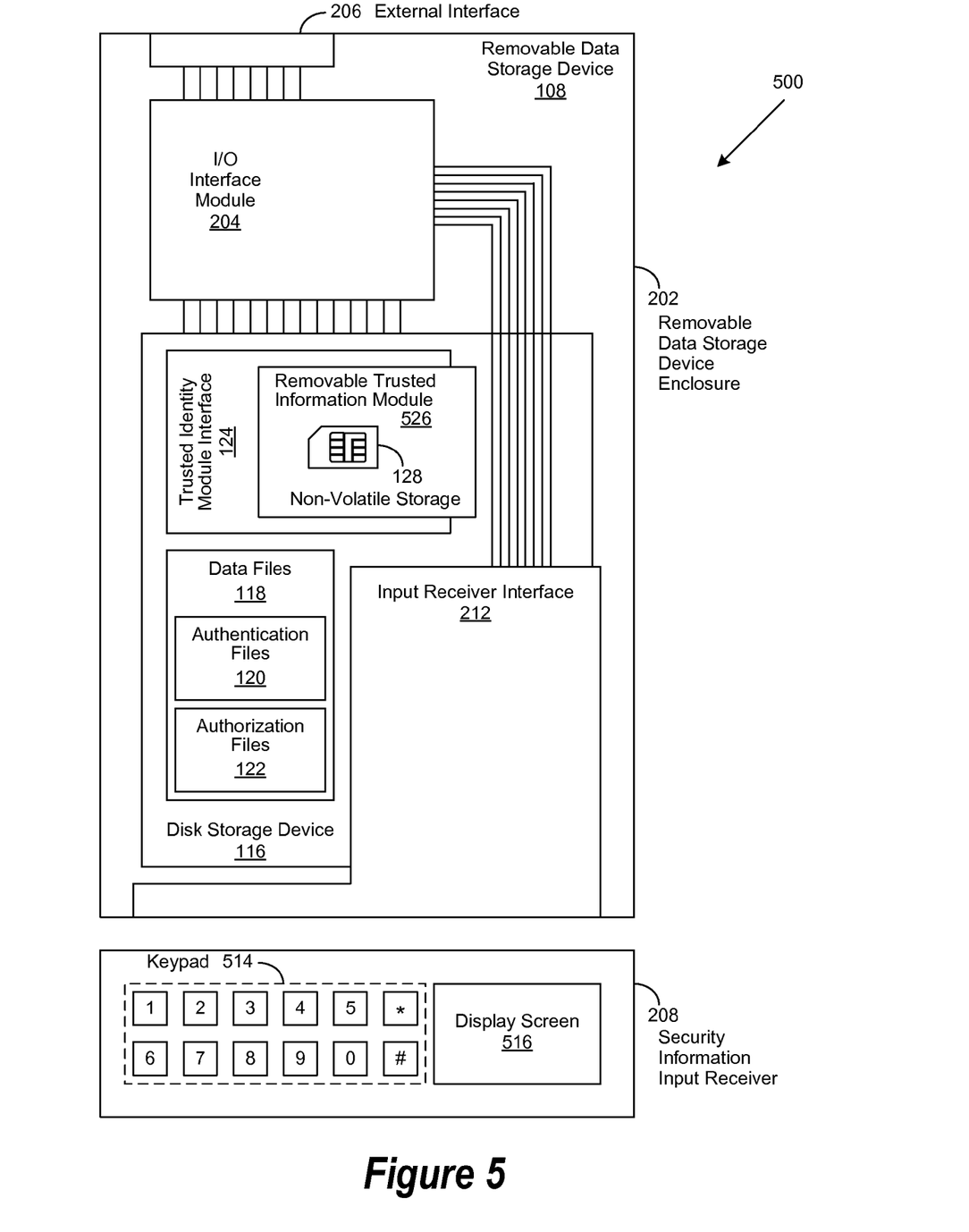
FIG. 5 is a generalized block diagram illustrating an embedded, TIM as implemented in an RDSD for user authentication in accordance with an embodiment of the invention.

FIG. 5 is a generalized block diagram illustrating an internally coupled, removable trusted information module (TIM) 500 as implemented in a removable data storage device (RDSD) for user authentication in accordance with an embodiment of the invention. In this embodiment, RDSD 108 comprises disk storage device 116, RDSD enclosure 202, input/output (I/O) interface module 204, external interface 206, and input receiver interface 212, which is coupled to input/output (I/O) interface module 204 and RDSD information input receiver 208. Disk storage device 116 further comprises an internally coupled TIM interface 124, further comprising internally-coupled and removable TIM 526, which comprises non-volatile storage medium 128, operable to securely store passwords, digital keys, digital certificates and other security credentials ("security credentials"). In one embodiment, internally-coupled and removable TIM 526 is coupled to TIM interface 124 by physical contacts. Disk storage device further comprises a plurality of data files 118, one or more authentication files 120, and one or more authorization files 122. RDSD information input receiver 208 comprises keypad 514 and display screen 516.

In an embodiment of the invention, a plurality of authentication and authorization processes are initiated by the internally-coupled and removable TIM 526 when the RDSD 108 is connected to an information handling system. Once RDSD 108 is connected to the information handling system, internally-coupled and removable TIM 526 generates user prompts on display screen 516 requesting predetermined user actions such as entering authentication or authorization codes using keypad 514. Once the requested codes have been entered, internally-coupled and removable TIM 526 uses the contents of one or more authentication files 120 and the security credentials stored in non-volatile storage medium 128 to perform comparison and cryptographic operations familiar to those of skill in the art to authenticate the user to the RDSD 106. If the user is successfully authenticated, the internally-coupled and removable TIM 526 uses the contents of one or more authentication files 120 and the security credentials stored in non-volatile storage medium 128 to perform similar comparison and cryptographic operations to authenticate RDSD 108 to the information handling system. Upon completion of the comparison and cryptographic operations, the authenticity of the RDSD 108 is determined and if the operations were successful, a message is conveyed by the internally-coupled and removable TIM 526 to the information system and visual acknowledgement is provided to the user via display screen 516 asserting the authenticity of the RDSD 108. Once the RDSD 108 has been successfully authenticated, the internally-coupled and removable TIM 526 performs similar comparison and cryptographic operations with the contents of one or more authorization files 122 to authorize the access and usage of the plurality of data files 118 by the information handling system. In one embodiment of the invention, the internally-coupled and removable TIM 526 performs other cryptographic operations to determine whether the integrity of data files 118 has been compromised. Their integrity status is then digitally conveyed to the information handling system and visually displayed to the user via display screen 516. In another embodiment, removal of the internally-coupled and removable TIM 526 prevents an information handling system from accessing the plurality of data files 118 comprising RDSD 108.

Figure 6:
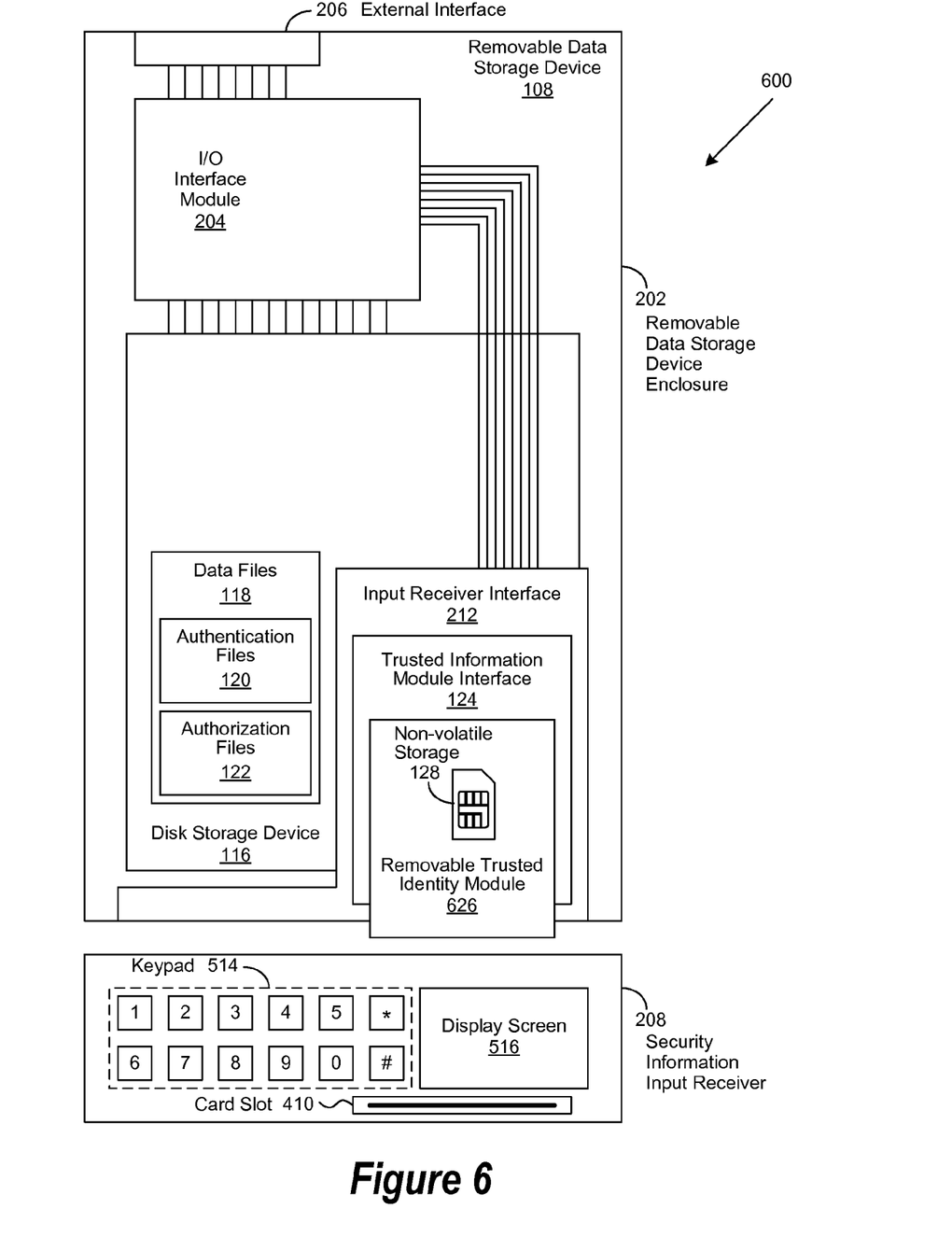
FIG. 6 is a generalized block diagram illustrating an externally-coupled TIM as implemented in an RDSD for user authentication in accordance with an embodiment of the invention.

FIG. 6 is a generalized block diagram illustrating an externally-coupled, removable trusted information module (TIM) 600 as implemented in a removable data storage device (RDSD) for user authentication in accordance with an embodiment of the invention. In this embodiment, RDSD 108 comprises disk storage device 116, RDSD enclosure 202, input/output (I/O) interface module 204, external interface 206, and input receiver interface 212, which is coupled to input/output (I/O) interface module 204 and RDSD information input receiver 208. Input receiver interface 212 further comprises the TIM interface 124, which further comprises externally-coupled and removable TIM 626, which comprises non-volatile storage medium 128, operable to securely store passwords, digital keys, digital certificates and other security credentials ("security credentials"). In one embodiment, externally-coupled and removable TIM 626 is coupled to TIM interface 124 by physical contacts. Disk storage device further comprises a plurality of data files 118, one or more authentication files 120, and one or more authorization files 122. RDSD security information input receiver 208 comprises keypad 514 display screen 516, and external card slot 410. In an embodiment of the invention, a plurality of authentication and authorization processes are initiated when the RDSD 108 is first connected to an information handling system and externally-coupled and removable TIM 626 is then connected to TIM interface 124 through external card slot 410. Once RDSD 108 is connected to the information handling system, externally-coupled and removable TIM 626 generates user prompts on display screen 516 requesting predetermined user actions such as entering authentication or authorization codes using keypad 514. Once the requested codes have been entered, externally-coupled and removable TIM 626 uses the contents of one or more authentication files 120 and the security credentials stored in non-volatile storage medium 128 to perform comparison and cryptographic operations familiar to those of skill in the art to authenticate the user to the RDSD 106. If the user is successfully authenticated, the externally-coupled and removable TIM 626 uses the contents of one or more authentication files 120 and the security credentials stored in non-volatile storage medium 128 to perform similar comparison and cryptographic operations to authenticate RDSD 108 to the information handling system. Upon completion of the comparison and cryptographic operations, the authenticity of RDSD 108 is determined and if the operations were successful, a message is conveyed by the externally-coupled and removable TIM 626 to the information system and visual acknowledgement is provided to the user via display screen 516 asserting the authenticity of RDSD 108. Once the RDSD 108 has been successfully authenticated, the externally-coupled and removable TIM 626 performs similar comparison and cryptographic operations with the contents of one or more authorization files 122 to authorize the access and usage of the plurality of data files 118 by the information handling system. In one embodiment of the invention, the externally-coupled and removable TIM 626 performs other cryptographic operations to determine whether the integrity of data files 118 has been compromised. Their integrity status is then digitally conveyed to the information handling system and visually displayed to the user via display screen 516. In another embodiment, removal of the externally-coupled and removable TIM 626 from external card slot 410 results in a loss of connection to TIM interface 124 and prevents an information handling system from accessing the plurality of data files 118 comprising RDSD 108. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A security system for a removable data storage device (RDSD), comprising:

one or more information handling systems each comprising a processor, at least one of the processors accessing a plurality of data files stored in said RDSD; and a trusted information module (TIM) comprising a non-volatile storage medium, the non-volatile storage medium securely storing security credentials, wherein said security credentials are not associated with a user;

wherein said TIM initiates executable software authentication and authorization processes to:

authenticate said RDSD to said information handling systems, wherein said executable software authentication and authorization processes are performed using said securely stored security credentials without user input of additional authentication or authorization information;

authorize access and usage of said plurality of data files by said one or more information handling systems; and, convey a message via the TIM to the one or more information handling systems asserting authenticity of the RDSD; and wherein said TIM initiates comparison and cryptographic operations using said executable software authentication and authorization processes to authenticate said one or more information handling systems to said RDSD;

said TIM initiates comparison and cryptographic operations using said executable software authentication and authorization processes to authenticate a predetermined user to said RDSD;

said TIM initiates executable software comparison and cryptographic operations to determine if the integrity of said plurality of data files has been compromised prior to authorizing their access and usage by said information handling systems;

said TIM is coupled to said RDSD through a predetermined interface, wherein:

said predetermined interface is internally coupled to said RDSD, said predetermined interface is externally coupled to said RDSD, or said TIM is removable from said predetermined interface.

2. The system of claim 1, wherein said RDSD is contained in an enclosure and said removable TIM is removable from said predetermined interface through said RDSD enclosure.

3. The system of claim 1, wherein removal of said removable TIM from said predetermined interface disables access to said plurality of data files by said one or more information handling systems.

4. A method for securing information stored in a plurality of data files on a removable data storage device (RDSD), comprising:

storing security credentials on a trusted information module (TIM) comprising a non-volatile storage medium, wherein said security credentials are not associated with a user;

initiating executable software authentication and authorization processes via said TIM to:

authenticate said RDSD to one or more information handling systems, wherein said executable software authentication and authorization processes are performed using said stored security credentials without user input of additional authentication or authorization information;

authorize access and usage of said plurality of data files by said one or more information handling systems; and, convey a message via the TIM to the one or more information handling systems asserting authenticity of the RDSD;

initiating, using said TIM, cryptographic operations using said executable software authentication and authorization processes to authenticate said one or more information handling systems to said RDSD;

initiating, using said TIM, cryptographic operations using said executable software authentication and authorization processes to authenticate a predetermined user to said RDSD;

initiating, using said TIM, executable software cryptographic operations to determine if the integrity of said plurality of data files has been compromised prior to authorizing their access and usage by said information handling systems; and wherein said TIM is coupled to said RDSD through a predetermined interface, wherein:

said predetermined interface is internally coupled to said RDSD, said predetermined interface is externally coupled to said RDSD, or said TIM is removable from said predetermined interface.

5. The method of claim 4, wherein said RDSD is contained in an enclosure and said TIM is removable from said predetermined interface through said RDSD enclosure.

6. The method of claim 4, wherein removal of said removable TIM from said predetermined interface disables access to said plurality of data files by said one or more information handling systems.

* * * * *